United States Patent [19]
Walker et al.

[11] Patent Number: 5,768,571
[45] Date of Patent: Jun. 16, 1998

[54] SYSTEM AND METHOD FOR ALTERING THE CLOCK FREQUENCY TO A LOGIC CONTROLLER CONTROLLING A LOGIC DEVICE RUNNING AT A FIXED FREQUENCY SLOWER THAN A COMPUTER SYSTEM RUNNING THE LOGIC DEVICE

[75] Inventors: Gary Walker, Phoenix; James J. Jirgal, Chandler, both of Ariz.

[73] Assignee: VLSI Technology, Inc., San Jose, Calif.

[21] Appl. No.: 705,356

[22] Filed: Aug. 29, 1996

[51] Int. Cl.⁶ .................................................. G06F 1/08
[52] U.S. Cl. ............................................................. 395/556
[58] Field of Search ................................................ 395/556

[56] References Cited

U.S. PATENT DOCUMENTS

| | | | |
|---|---|---|---|
| 5,086,387 | 2/1992 | Arroyo et al. | 395/556 |
| 5,432,468 | 7/1995 | Moriyama et al. | 395/556 X |
| 5,479,644 | 12/1995 | Hongo | 395/556 |
| 5,561,792 | 10/1996 | Ganapathy | 395/556 |
| 5,586,308 | 12/1996 | Hawkins et al. | 395/556 |

*Primary Examiner*—Thomas M. Heckler
*Attorney, Agent, or Firm*—Jeffrey D. Moy; Allen J. Moss; Harry M. Weiss & Associates, P.C.

[57] ABSTRACT

A system for altering a clock frequency to a logic controlling device that controls logic which runs at a fixed frequency slower than a frequency of a computer system running the logic. The system speeds up the clock signal to a logic controller when the logic controller is arbitrating between different operational requests. When the logic controller acknowledges a specific operational request, the clock controller immediately slows the clock signal down in order to allow a command strobe length that the logic device executing a specific operation request requires.

13 Claims, 1 Drawing Sheet

SYSTEM AND METHOD FOR ALTERING THE CLOCK FREQUENCY TO A LOGIC CONTROLLER CONTROLLING A LOGIC DEVICE RUNNING AT A FIXED FREQUENCY SLOWER THAN A COMPUTER SYSTEM RUNNING THE LOGIC DEVICE

BACKGROUND OF THE INVENTION

1. Field of the Invention

This invention relates to computer systems and, more specifically, to a system and method for altering the clock frequency to a logic controller that controls the operation of a logic device which runs at a fixed frequency slower than the frequency of a computer system running the logic device.

2. Description of the Prior Art

In the original International Business Machine (IBM) personal computer (PC) AT, logic devices within the PC ran at a fixed frequency. For example, the Direct Memory Access (DMA) controllers in the original IBM PCs ran at a fixed four (4) MHz frequency. The DMA controller sampled its inputs and drove its outputs based on this clock frequency.

The inputs to the DMA controller were asynchronous signals. Thus, the input signals could change states at the same time as the clock signal. To prevent a metastable condition which may occur when the clock samples a signal transitioning coincidently with the clock signal, the sample circuit must "double sample" all asynchronous signals. The double sampling of the signals introduced rather long delays in the reaction time of the DMA controllers to such things as request for DMA transfers by DMA I/O devices.

In a typical DMA transfer, the DMA I/O device first asserts a DMA request signal DRQ. The DMA controller double samples the signal—2×4 MHz (500 ns). The DMA controller arbitrates this DRQ signal with any others that may be asserted. When the DMA controller acknowledges a DMA request, the DMA controller asserts a DMA acknowledge signal DACK. This takes another one (1) or two (2) clock cycles (500 ns). The DMA controller then asserts a command strobe for an additional one (1) or two (2) clock cycles. Thus, as can be seen from the above analysis, in an original IBM PC AT, a DMA cycle can take at least 1500 ns to transfer a single unit of data.

Later computer systems were designed that gave the option of running the DMA controller at a faster frequency of eight (8) MHz. This worked as the industry provided faster DMA I/O devices and computer systems had faster memory. However, these systems may not be compatible with earlier DMA I/O devices which operated on a fixed frequency slower than the eight (8) MHz. Furthermore, eight (8) MHz is still relatively slow as compared to sixty-six (66) MHz processors and memory, as well as thirty-three (33) MHz PCI devices.

Therefore, a need existed to provide an improved system for controlling the operating frequency of logic controlling devices such as DMA controllers. The improved system must give the option to shorten the long time between the arbitration phase and the command strobe assertion phase while still allowing the command strobe length that some older logic devices require.

SUMMARY OF THE INVENTION

In accordance with one embodiment of the present invention, it is an object of the present invention to provide an improved system for controlling the operating frequency of logic controlling devices.

It is another object of the present invention to provide an improved system for controlling the operating frequency of logic controlling devices such as DMA controllers.

It is still another object of the present invention to provide an improved system for controlling the operating frequency of logic controlling devices that will give the option to shorten the long time between the arbitration phase and the command strobe assertion phase in the logic controller, while still allowing the command strobe length that some older logic devices require.

BRIEF DESCRIPTION OF THE PREFERRED EMBODIMENTS

In accordance with one embodiment of the present invention, a system is disclosed which alters a clock frequency to a logic controlling device which controls logic running at a fixed frequency slower than a frequency of a computer system running the logic. The system is comprised of a plurality of elements one of which is logic device means. The logic device means runs at a fixed frequency slower than a running frequency of the computer system running the logic device means. The logic device means is used for transferring information and for performing operations for the computer system. Logic controller means are coupled to the logic device means and are used for arbitrating between different operational requests by the logic device means and for generating a command strobe for execution of a selected operational request. Clock controller means are coupled to the logic controller means for providing a clock signal to the logic controller means and for altering the clock signal from an arbitration frequency to a command strobe frequency and from the command strobe frequency back to the arbitration frequency based on a state of operation of the logic controller means, the command strobe frequency being the fixed frequency of the logic device means. Register means are coupled to the clock controller means for signalling the clock controller means when to alter the clock frequency to the logic controller means.

In accordance with another embodiment of the present invention, a method is disclosed which provides a system for altering a clock frequency to a logic controlling device that controls logic which runs at a fixed frequency slower than a frequency of a computer system running the logic. The method comprises the steps of: providing logic device means which runs at a fixed frequency slower than a running frequency of a computer system running the logic device means for transferring information and for performing operations for the computer system; providing logic controller means coupled to the logic device means for arbitrating between different operational requests by the logic device means and for generating a command strobe for execution of a selected operational request; providing clock controller means coupled to the logic controller means for providing a clock signal to the logic controller means and for altering the clock signal from an arbitration frequency to a command strobe frequency and from the command strobe frequency back to the arbitration frequency based on a state of operation of the logic controller means wherein the command strobe frequency is the fixed frequency of the logic device means; and providing register means coupled to the clock controller means for signalling the clock controller means when to alter the clock frequency to the logic controller means.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENT

Figure 1:
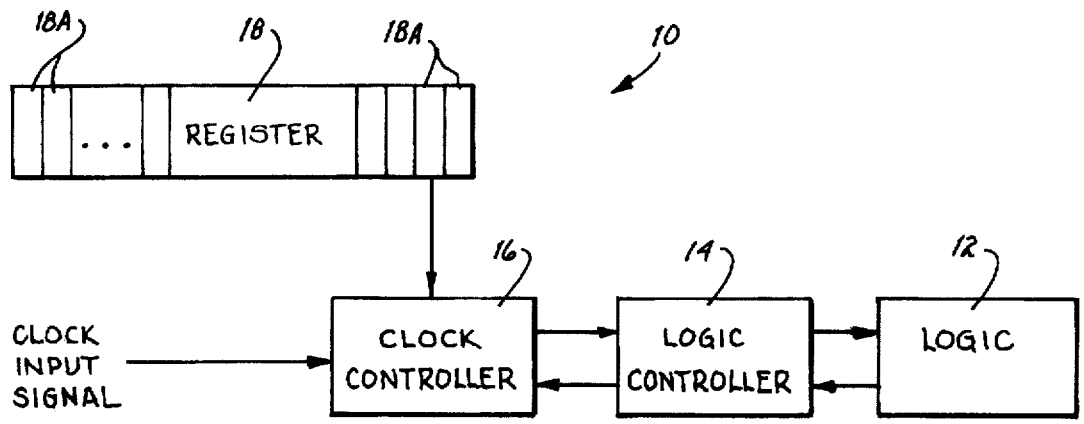
FIG. 1 is a simplified functional block diagram of a system for controlling the operating frequency of a logic controlling device that controls logic which runs at a fixed frequency slower than a running frequency of a computer system running the logic.

Referring to FIG. 1, a system 10 is shown that allows for the altering of the clock frequency to a logic controller 14 which controls a logic device 12 which runs at a fixed frequency slower than a running frequency of a computer system running the logic device 12. The system 10 is comprised of a plurality of elements one of which is the logic device 12. The logic device 12 runs at a fixed frequency which is slower than a frequency of a computer system running the logic device 12. The logic device 12 is generally used for transferring data and for performing operations within the computer system. In the preferred embodiment of the present invention, the logic device 12 is a DMA I/O device.

A logic controller 14 is coupled to the logic device 12. The logic controller 14 arbitrates between different operational requests by the logic device 12 (i.e., different DMA requests). When the logic controller 14 acknowledges a specific operational request, the logic controller 14 will generate a command strobe to execute the selected operational request. In the preferred embodiment of the present invention, the logic controller 14 is a DMA controller.

A clock controller 16 has an output which is coupled to the logic controller 14. A clock signal is inputted to the clock controller 16 which allows the clock controller 16 to provide a clock signal to the logic controller 14. The clock controller 16 is able to alter the inputted clock signal and send the altered clock signal to the logic controller 14. Based on the current operating condition of the logic controller 14, different clock signals will be sent to the logic controller 14. For example, when the logic controller is in an arbitration state (i.e., receiving different operational requests), the clock controller 16 will transmit a faster frequency (i.e., arbitration frequency) to the logic controller 14. Once the logic controller 14 acknowledges a specific operational requests, the clock controller 16 can alter the frequency of the clock signal to a slower frequency (i.e., command strobe frequency, wherein the command strobe frequency is the fixed frequency of the logic device 12) for execution of the operational request. After execution of the desired operational request, the clock controller 16 may increase the clock signal back to an arbitration frequency.

A register 18 is coupled to the clock controller 16. The register is comprised of a plurality of bits 18A. At least one of the plurality of bits 18A is used to signal the clock controller 16 whether to alter the clock frequency to the logic controller 14 between the arbitration state and the command strobe state. The clock controller 16 may then alter the clock signal based on the state of operation of the logic controller 14. Another bit of the plurality of bits 18A is used to select the desired command strobe frequency. The command strobe frequency is based on the command strobe length that the logic device 12 requires. The register 18 is therefore able to signal the clock controller 16 to alter the command strobe frequency to match fixed frequencies of different logic devices 12 which may be coupled to the logic controller 14.

OPERATION

Figure 2:
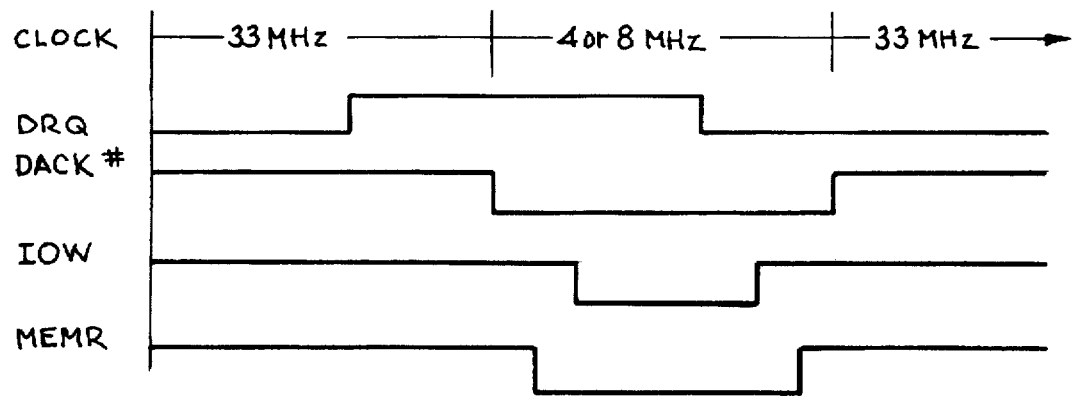
FIG. 2 is a timing diagram for the system depicted in FIG. 1.

Referring to FIGS. 1 and 2, the operation of system 10 will be described. As stated above, in the preferred embodiment of the present invention, the logic device 12 is a DMA I/O device and the logic controller 14 is a DMA controller. Thus, the operation of the system 10 will be described as related to DMA devices. However, this should not be taken as a limitation of the system 10.

When a DMA I/O device 12 requires a DMA transfer, the DMA I/O device 12 will assert a DMA request signal DRQ. The DMA controller 14 will then arbitrate between the different DMA requests. As can be seen from FIG. 2, prior to the DMA request, and during the time of arbitration, the clock controller 16 will send a thirty-three (33) MHz clock signal to DMA controller 14. Once the DMA controller 14 acknowledges a specific DMA request, the DMA controller 14 will assert a DMA acknowledge signal DACK. Once the DACK signal has been asserted, the clock controller 16 will slow down the clock signal to allow the command strobe length that the DMA I/O device 12 requires.

Thus, the system 10 gives the option of shortening the long time between a DMA I/O devices's DRQ assertion and the DMA controller's command strobe assertion while still allowing the command strobe length that some older DMA I/O devices require. The system 10 speeds up the clock signal when the DMA controller 14 is arbitrating between different DMA requests, and then immediately slows the clock signal down when a DACK assertion occurs.

For a DMA controller running at a fixed four (4) MHz frequency, the DRQ to end of command strobe time is 1500 ns (see Description of the Prior Art). Using the system 10 with a thirty-three (33) MHz clock signal for arbitration, the DRQ to DACK assertion time is reduced from 1000 ns to 120 ns. If the clock runs at eight (8) MHz, the command strobe time is reduced by half of the original PC AT DMA time. Thus, from an original 1500 ns DRQ to end of command strobe time, the system 10 takes only 120 ns+250 ns=370 ns. This is an improvement of 75 percent.

While the invention has been particularly shown and described with reference to a preferred embodiment thereof, it should be understood by those skilled in the art that changes in form and detail may be made therein without departing from the spirit and scope of the invention.

What is claimed is:

1. A system for altering a clock frequency to a logic controlling device that controls logic which runs at a fixed frequency slower than a frequency of a computer system running said logic comprising, in combination:

logic device means which runs at a fixed frequency slower than a frequency of a computer system running said logic device means for transferring information and for performing operations for said computer system;

logic controller means coupled to said logic device means for arbitrating between different operational requests by said logic device means and for generating a command strobe for execution of a selected operational request;

clock controller means coupled to said logic controller means for providing a clock signal to said logic controller means and for altering said clock signal from an arbitration frequency to a command strobe frequency and from said command strobe frequency back to said arbitration frequency based on a state of operation of said logic controller means wherein said command strobe frequency is said fixed frequency of said logic device means; and register means coupled to said clock controller means for signalling said clock controller means whether to alter said clock frequency to said logic controller means.

2. The system of claim 1 wherein said clock controller means alters said command strobe frequency to match fixed frequencies of different logic device means coupled to said logic controller means.

3. The system of claim 2 wherein said register means comprises a plurality of bits wherein at least one bit of said plurality of bits sets said command strobe frequency to match said fixed frequency of said logic means and a second bit of said plurality of bits signals said clock controller means whether to generate said arbitration frequency.

4. The system of claim 1 wherein said logic device means is a DMA I/O device.

5. The system of claim 4 wherein said logic controller means is a DMA controller.

6. A system for altering a clock frequency to a logic controlling device that controls logic which runs at a fixed frequency slower than a frequency of a computer system running said logic comprising, in combination:

DMA I/O device means which runs at a fixed frequency slower than a frequency of a computer system running said DMA I/O device means for transferring information and for performing operations for said computer system;

DMA controller means coupled to said DMA I/O device means for arbitrating between different operational requests by said DMA I/O device means and for generating a command strobe for execution of a selected operational request;

clock controller means coupled to said DMA controller means for providing a clock signal to said DMA controller means and for altering said clock signal from an arbitration frequency to a command strobe frequency and from said command strobe frequency back to said arbitration frequency based on a state of operation of said DMA controller means wherein said command strobe frequency is said fixed frequency of said DMA I/O device means; and register means coupled to said clock controller means for signalling said clock controller means whether to alter said clock frequency to said logic controller means.

7. The system of claim 6 wherein said clock controller means alters said command strobe frequency to match fixed frequencies of different DMA I/O device means coupled to said DMA controller means.

8. The system of claim 7 wherein said register means comprises a plurality of bits wherein at least one bit of said plurality of bits sets said command strobe frequency to match said fixed frequency of said logic means and a second bit of said plurality of bits signals said clock controller means whether to generate said arbitration frequency.

9. A method of providing a system for altering a clock frequency to a logic controlling device that controls logic which runs at a fixed frequency slower than a frequency of a computer system running said logic comprising the steps of:

providing logic device means which runs at a fixed frequency slower than a frequency of a computer system running said logic device means for transferring information and for performing operations for said computer system;

providing logic controller means coupled to said logic device means for arbitrating between different operational requests by said logic device means and for generating a command strobe for execution of a selected operational request;

providing clock controller means coupled to said logic controller means for providing a clock signal to said logic controller means and for altering said clock signal from an arbitration frequency to a command strobe frequency and from said command strobe frequency back to said arbitration frequency based on a state of operation of said logic controller means wherein said command strobe frequency is said fixed frequency of said logic device means; and providing register means coupled to said clock controller means for signalling said clock controller means whether to alter said clock frequency to said logic controller means.

10. The method of claim 9 wherein said step of providing clock controller means further comprises the step of providing clock controller means that alters said command strobe frequency to match fixed frequencies of different logic device means coupled to said logic controller means.

11. The method of claim 9 wherein said step of providing register means further comprises the step of providing register means having a plurality of bits wherein at least one bit of said plurality of bits sets said command strobe frequency to match said fixed frequency of said logic means and a second bit of said plurality of bits signals said clock controller means whether to generate said arbitration frequency.

12. The method of claim 9 wherein said step of providing logic device means further comprises the step of providing a DMA I/O device.

13. The method of claim 12 wherein said step of providing logic controller means further comprises the step of providing a DMA controller.

\* \* \* \* \*